United States Patent
Murnan et al.

(10) Patent No.: US 11,352,144 B2
(45) Date of Patent: Jun. 7, 2022

(54) TWO-PIECE CENTER FRAME ASSEMBLY (71) Applicant: Safran Seats USA LLC, Gainesville, TX (US)

(72) Inventors: Justin K. Murnan, Whitesboro, TX (US); Christopher D. Stewart, Saint Jo, TX (US)

(73) Assignee: Safran Seats USA LLC, Gainesville, TX (US)

(*) Notice: Subject to any disclaimer, the term of this patent is extended or adjusted under 35 U.S.C. 154(b) by 0 days.

(21) Appl. No.: 16/755,498

(22) PCT Filed: Oct. 11, 2017

(86) PCT No.: PCT/US2017/056022
§ 371 (c)(1),
(2) Date: Apr. 10, 2020

(87) PCT Pub. No.: WO2019/074495
PCT Pub. Date: Apr. 18, 2019

(65) Prior Publication Data
US 2021/0206495 A1    Jul. 8, 2021

(51) Int. Cl.
*B64D 11/06* (2006.01)
*B60N 2/68* (2006.01)

(52) U.S. Cl.
CPC .......... *B64D 11/0648* (2014.12); *B60N 2/682* (2013.01)

(58) Field of Classification Search
CPC .............................. B64D 11/064; B60N 2/682
See application file for complete search history.

(56) References Cited

U.S. PATENT DOCUMENTS

| 5,553,923 | A | * | 9/1996 | Bilezikjian | B64D 11/06 |
| | | | | | 297/452.2 |
| 5,730,492 | A | | 3/1998 | Warrick et al. | |
| 2003/0094542 | A1 | | 5/2003 | Williamson | |
| 2011/0101162 | A1 | | 5/2011 | Zimmermann et al. | |
| 2019/0092476 | A1 | * | 3/2019 | Gross | B60N 2/10 |

(Continued)

FOREIGN PATENT DOCUMENTS

DE    102009020199 A1    11/2009
DE    102012020032 A1    4/2014
(Continued)

OTHER PUBLICATIONS

International Patent Application No. PCT/US2017/056022, International Search Report and Written Opinion, dated Jun. 13, 2018.

*Primary Examiner* — Timothy J Brindley
(74) *Attorney, Agent, or Firm* — Kilpatrick Townsend & Stockton LLP (57) ABSTRACT

A central frame assembly for a passenger seat of a vehicle includes a spreader member (201) and a lower frame member (101) comprising at least one clamp member (121) for securing the lower frame member (101) relative to the spreader member (201). The lower frame member (101) may include a vertical portion (102) with a forward lower attachment portion (102.1) and an aft portion (103) with an aft lower attachment portion (103.1). The spreader member (201) and the lower frame member (101) may be aligned such that a centerline of the spreader member (201) and a centerline of the lower frame member (101) are approximately coplanar.

16 Claims, 6 Drawing Sheets

(56) References Cited

U.S. PATENT DOCUMENTS

2019/0291616 A1* 9/2019 Gilbert .................. B60N 2/682
2020/0391869 A1* 12/2020 Sikorski ............. B64D 11/0648

FOREIGN PATENT DOCUMENTS

| DE | 102019127049 A1 * | 4/2021 | ............ B64D 11/06 |
| EP | 0877674 A1 | 11/1998 | |
| EP | 3689750 A1 * | 8/2020 | ........... B60N 2/2209 |
| WO | WO-2017044157 A1 * | 3/2017 | ............ F16B 7/0433 |
| WO | WO-2018106767 A1 * | 6/2018 | ......... B64D 11/0696 |

* cited by examiner

TWO-PIECE CENTER FRAME ASSEMBLY

FIELD OF THE INVENTION

The field of the invention relates to center frame assemblies for passenger seats in aircraft or the like.

BACKGROUND

Passenger seats, and particularly vehicle or aircraft passenger seats, are designed to ensure passenger safety for various loading conditions including, for example, hard landings and crash conditions. In some instances, regulatory and/or governmental requirements dictate that seats comply with occupant protection/impact tests. The seats must be capable of sustaining loads that cause floor deformation in the vehicle and/or significant inertial loads related to the mass of the occupant. Conventional seats (typically designed for two to four occupants) use a framework arrangement with an even number of frame assemblies along the lateral length of the seat and a plurality of support members that extend laterally and connect to each of the plurality of frame assemblies. Typically, the spreader or upper portions of the frame assemblies are offset (in the lateral direction) from the lower portion of the frame and, because there are typically an even number of frame assemblies along the length of the seat, there is not a lower frame component (or any portion of a frame assembly) at the center of the seat in the lateral direction.

In certain situations, it may be desirable to design seats and related framework to minimize weight and maximize structural efficiency with load paths configured to transfer load from the passenger through the seat and into the structure of the aircraft. In particular, it may be desirable to design and produce a framework for a seat with an odd number of frame assemblies and a central frame assembly location in the middle of the passenger seat in the lateral direction.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a central frame assembly for a passenger seat of a vehicle comprises: a spreader member; and a lower frame member comprising at least one clamp member for securing the lower frame member relative to the spreader member, wherein: the lower frame member comprises a vertical portion with a forward lower attachment portion and an aft portion with an aft lower attachment portion; and the spreader member and the lower frame member are aligned such that a centerline of the spreader member and a centerline of the lower frame member are approximately coplanar.

In some embodiments, the at least one clamp member comprises a slot such that a portion of the spreader member is disposed within the slot.

The at least one clamp member, in certain embodiments, comprises at least one interface hole that is coaxial with an interface hole of the spreader member when the spreader member is disposed within the slot.

In some embodiments, the at least one clamp member comprises at least one fastener hole that extends through the slot and is coaxial with a fastener hole of the spreader member when the spreader member is disposed within the slot.

The at least one clamp member, in certain embodiments, comprises a left clevis portion and a right clevis portion such that a lug member of the spreader member is disposed between the left and right clevis portions.

In certain embodiments, the lower frame member comprises a forward clamp clevis member defining a forward slot and an aft clamp clevis member defining an aft slot; the spreader member comprises a forward lug member and an aft lug member; the forward lug member of the spreader member is disposed within the forward slot; and the aft lug member of the spreader member is disposed within the aft slot.

In some embodiments, the forward clamp clevis member comprises at least one fastener hole extending through the forward slot that is coaxial with a fastener hole of the forward lug member of the spreader member; and the aft clamp clevis member comprises at least one fastener hole extending through the aft slot that is coaxial with a fastener hole of the aft lug member of the spreader member.

According to certain embodiments of the present invention, a passenger seat comprises: a forward lateral member extending in a lateral direction of the passenger seat; an aft lateral member extending in the lateral direction; a central frame assembly disposed at a center of the passenger seat in the lateral direction; wherein the central frame assembly comprises: a spreader member; a lower frame member comprising a forward clamp member and an aft clamp member for securing the lower frame member relative to the spreader member; wherein the lower frame member comprises a vertical portion with a forward lower attachment portion and an aft portion with an aft lower attachment portion; and wherein the central frame assembly is attached to the forward lateral member and the aft lateral member.

The spreader member and the lower frame member, in certain embodiments, are aligned such that a centerline of the spreader member and a centerline of the lower frame member are approximately coplanar.

In certain embodiments, the forward clamp member comprises a forward slot such that a portion of the spreader member is disposed within the forward slot.

The aft clamp member, in certain embodiments, comprises a aft slot such that a portion of the spreader member is disposed within the aft slot.

In certain embodiments, at least one of the forward clamp member and the aft clamp member comprises at least one fastener hole that extends in the lateral direction and is coaxial with a fastener hole of the spreader member.

In some embodiments, the forward clamp member comprises a first interface hole and the spreader member comprises a forward interface hole that is aligned with the first interface hole when the spreader member is disposed within the forward slot.

The forward lateral member, in certain embodiments, is disposed inside the first interface hole and the forward interface hole such that the forward lateral member, the first interface hole, and the forward interface hole are all coaxial with one another.

In certain embodiments, the aft clamp member comprises a second interface hole and the spreader member comprises an aft interface hole that is aligned with the second interface hole when the spreader member is disposed within the aft slot.

The aft lateral member, in certain embodiments, is disposed inside the second interface hole and the aft interface hole such that the aft lateral member, the second interface hole, and the aft interface hole are all coaxial with one another.

The passenger seat, in certain embodiments, further comprises a first lock fastener extending through at least a portion of the forward clamp member of the lower frame member, through at least a portion of the forward lateral member, and through at least a portion of the spreader member to prevent the central frame assembly from moving relative to the forward lateral member.

In some embodiments, the passenger seat further comprises a second lock fastener extending through at least a portion of the aft clamp member of the lower frame member, through at least a portion of the aft lateral member, and through at least a portion of the spreader member to prevent the central frame assembly from moving relative to the aft lateral member.

In certain embodiments, the forward clamp member comprises a forward slot and the aft clamp member comprises an aft slot; the spreader member comprises a forward lug member and an aft lug member; the forward lug member of the spreader member is disposed within the forward slot; and the aft lug member of the spreader member is disposed within the aft slot.

In some embodiments, the forward clamp member comprises at least one fastener hole extending through the forward slot that is coaxial with a fastener hole of the forward lug member of the spreader member; and the aft clamp member comprises at least one fastener hole extending through the aft slot that is coaxial with a fastener hole of the aft lug member of the spreader member.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
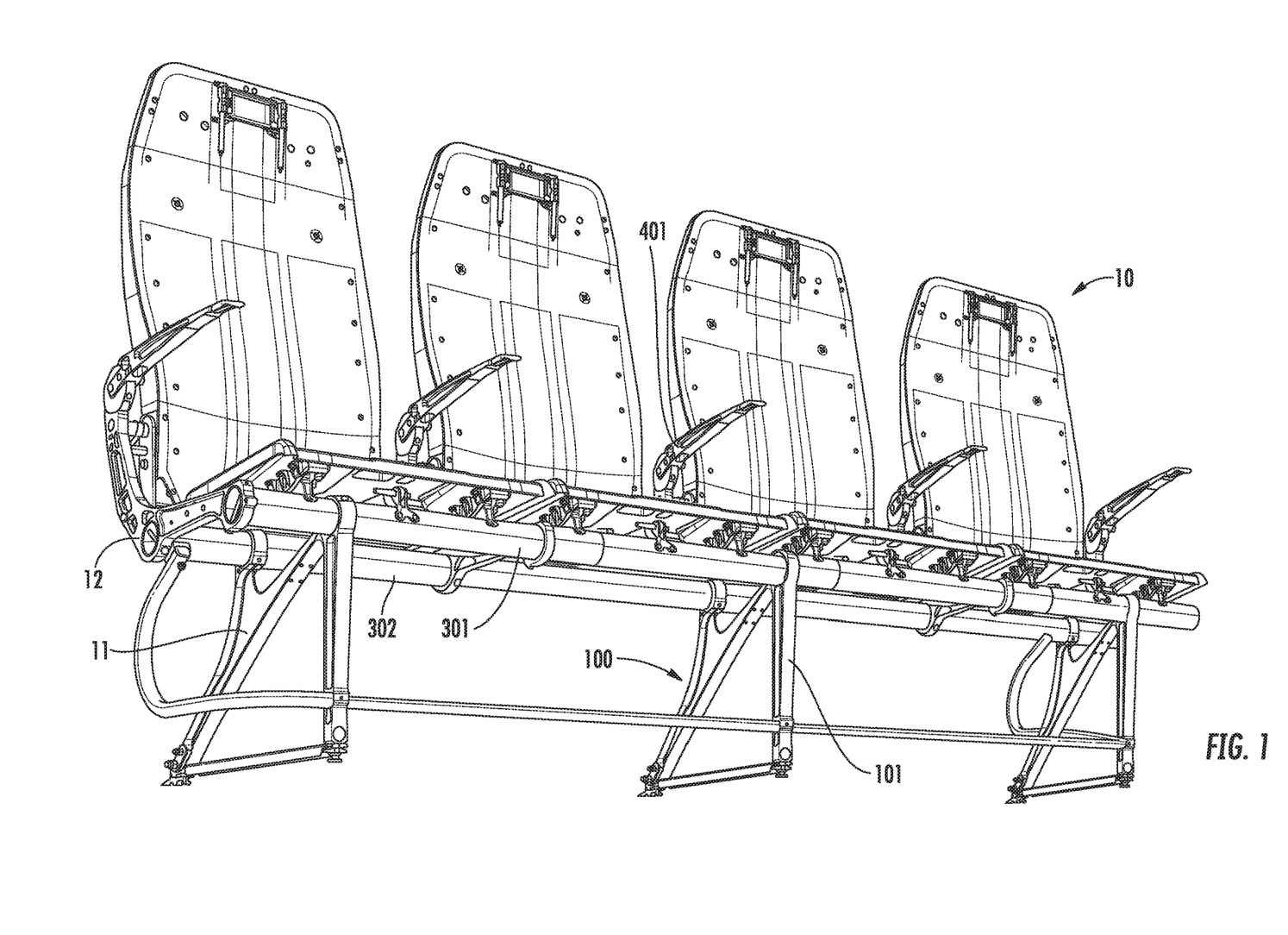
FIG. 1 is a perspective view of a passenger seat according to certain embodiments of the present invention.

FIGS. 1-6B illustrate embodiments of central frame assemblies 100 for passenger seats 10 in vehicles such as an aircraft where each passenger seat 10 includes a forward lateral member 301 and an aft lateral member 302 such that the central frame assembly 100 is located at the center of the passenger seat 10 in the lateral direction. The lateral direction is defined by the axial direction of the lateral members 301, 302 and typically corresponds to the lateral direction of the vehicle (assuming that the passenger seats 10 face forward). The various frame assemblies are arranged such that they are each approximately perpendicular to the lateral direction. The illustrated passenger seat 10 includes provisions for four passengers and, in addition to the central frame assembly 100, includes frame assemblies at each lateral end of the seat 10. However, the passenger seat 10 may include provisions for any number of passengers and may include any number of frame assemblies in addition to the central frame assembly 100. Each frame assembly (including central frame assembly 100 attaches to the floor of the vehicle). For example, as shown in FIG. 1, the passenger seat 10 may include a spreader member 12 at a lateral end and a lower frame member 11 that is offset from the spreader member 12 in the lateral direction. The central frame assembly 100 may include a lower frame member 101 and a spreader member 201 that are aligned with one another in the lateral direction (see FIGS. 2 and 3). In some embodiments, the respective centerlines of the lower frame member 101 and the spreader member 201 are approximately coplanar. The central frame assembly 100 may include an armrest member 401 attached to the spreader member 201 (see FIGS. 1-3).

In some embodiments, the central frame assembly 100 may interface with the forward lateral member 301 and the aft lateral member 302 such that the interface with the lateral members 301, 302 is common to the lower frame member 101 and the spreader member 201. The lower frame member 101 may include a forward interface hole 181 and an aft interface hole 182 for attachment to the forward lateral member 301 and the aft lateral member 302, respectively (see FIGS. 4 and 5). In some embodiments, the spreader member 201 includes a forward interface hole 281 that is coaxial with the forward interface hole 181 of the lower frame member 101 and an aft interface hole 282 that is coaxial with the aft interface hole 182 of the lower frame member 101 (see FIGS. 6A and 6B). The inner dimension (diameter if cylindrical) of the interface hole 181 and interface hole 281 may be approximately the same as (or slightly larger than) the outer dimension (e.g., diameter) of forward lateral member 301. Similarly, the inner dimension (diameter if cylindrical) of the interface hole 182 and interface hole 282 may be approximately the same as (or slightly larger than) the outer dimension (e.g., diameter) of aft lateral member 302. Although the interface holes 181, 182, 281, 282 are illustrated as circular and the lateral members 301, 302 are illustrated as cylindrical, these components may have any appropriate shape (or cross-sectional shape) including elliptical, oval, square, rectangular, triangular, or any other appropriate shape.

Figure 4:
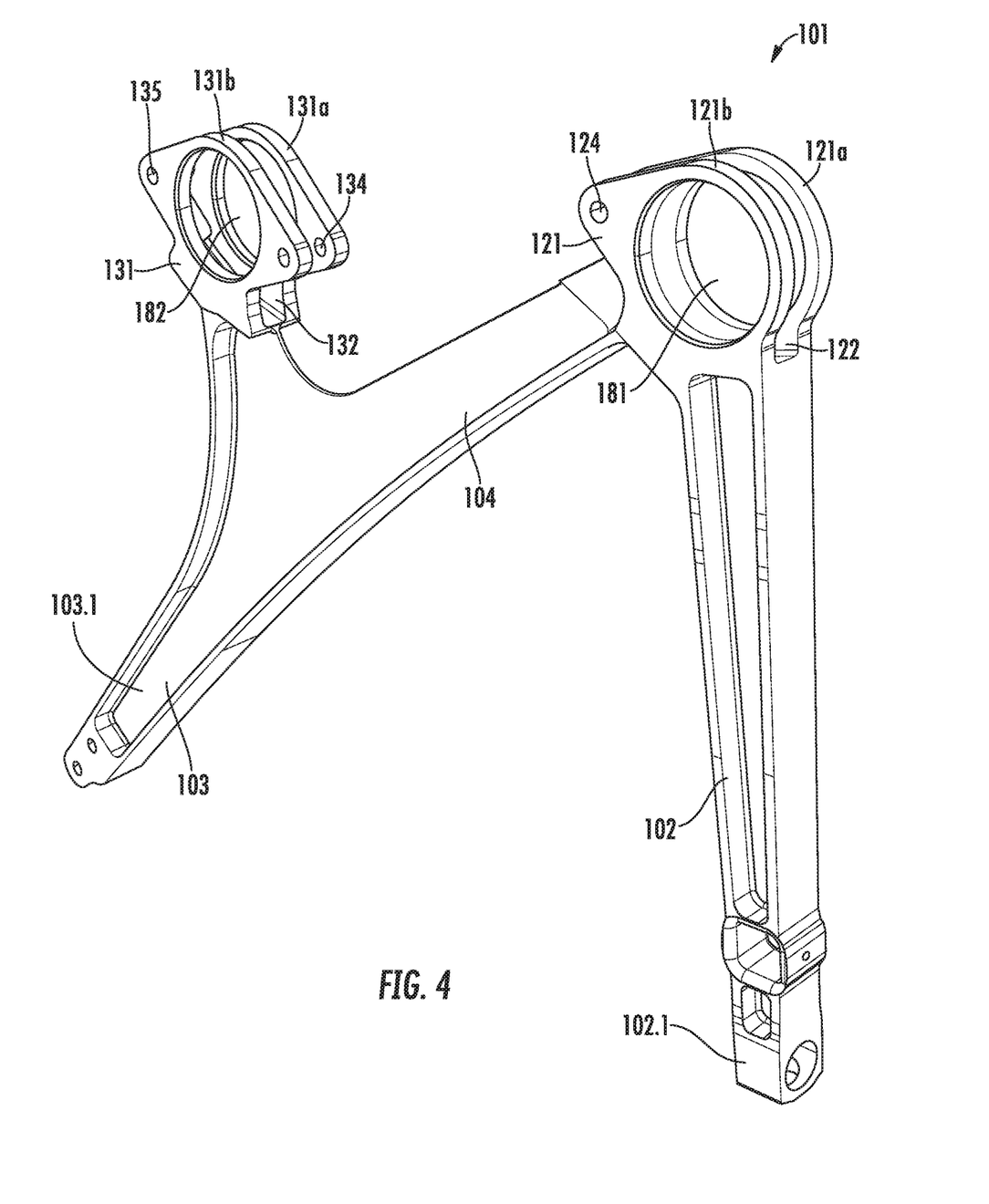
FIG. 4 is a front perspective view of a lower frame member of the central frame assembly of FIG. 2.
Figure 5:
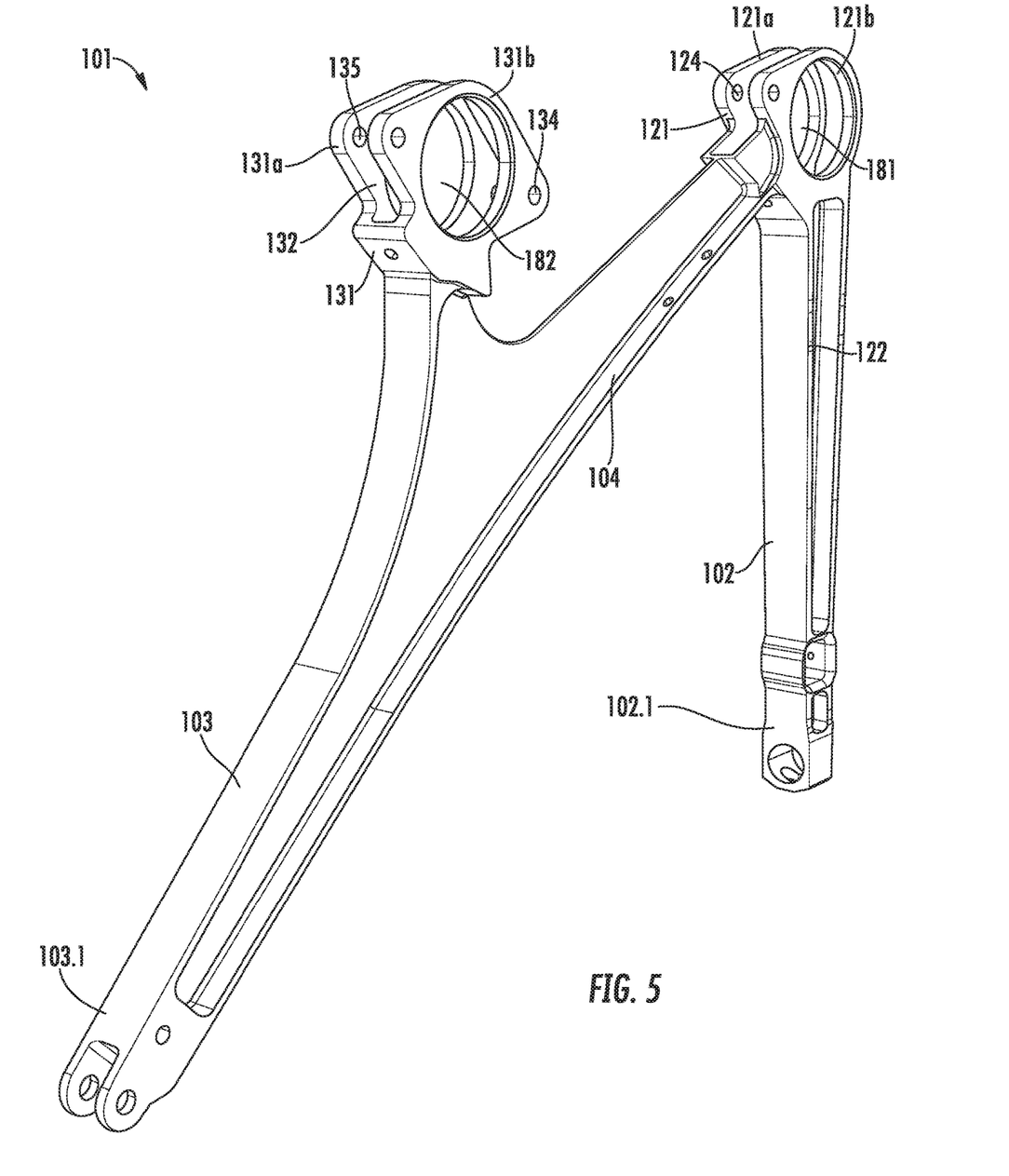
FIG. 5 is a rear perspective view of the lower frame member of FIG. 4.
Figure 6A:
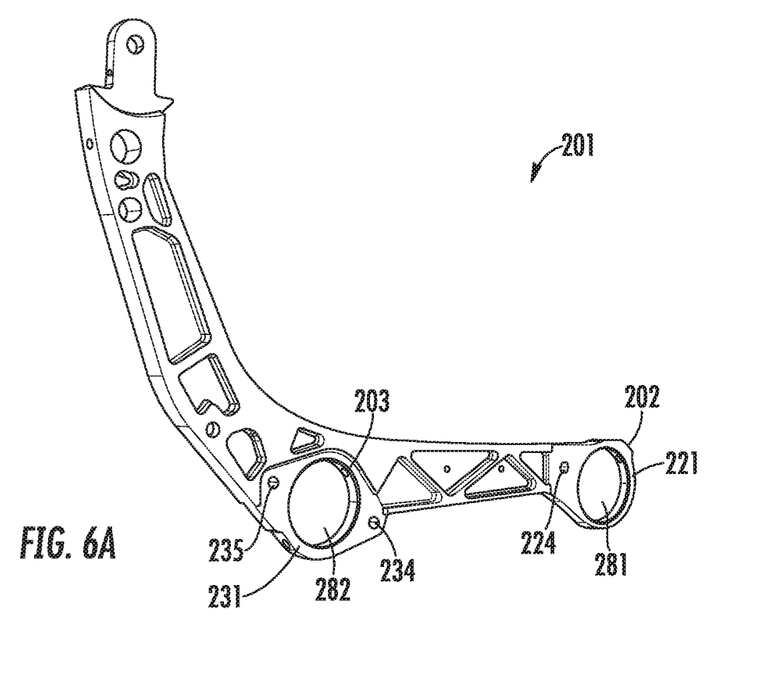
FIG. 6A is a rear perspective view of a spreader member of the central frame assembly of FIG. 2.
Figure 6B:
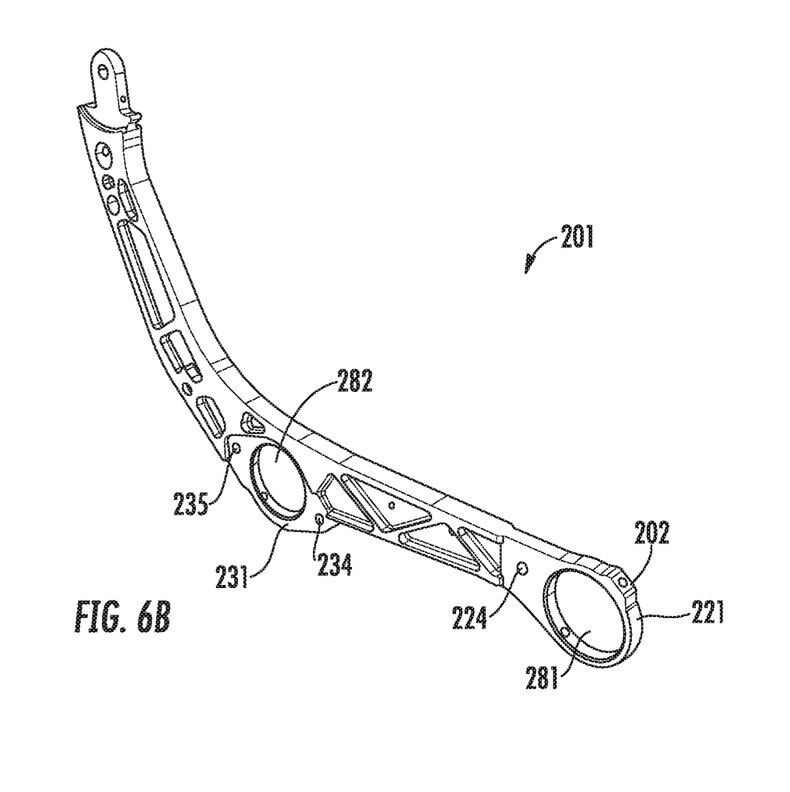
FIG. 6B is a front perspective view of the spreader member of FIG. 6A.

The lower frame member 101 may include at least one clamp member where the at least one clamp member secures the lower frame member 101 relative to the spreader member 201. In some embodiments, the at least one clamp member includes a forward clamp clevis member 121 and an aft clamp clevis member 131. The lower frame member 101 may include a vertical portion 102 that attaches to the forward clamp clevis member 121 (that interfaces with the forward lateral member 301) such that the vertical portion 102 is approximately vertical and may include a forward lower attachment portion 102.1 that attaches to a forward location of the floor of the vehicle. As shown in the drawings, the vertical portion 102 may be located on the forward side of the lower frame member 101. In some embodiments, the attachment of the vertical portion 102 at the floor is located forward of the forward clamp clevis member 121. As shown in the drawings, the vertical portion 102 may include flanges on one or both of the forward and aft sides thereof. The lower frame member 101 may also include an aft portion 103 that may include an aft lower attachment portion 103.1 that attaches to an aft location of the floor of the vehicle. The aft portion 103 may also attach to both (a) the forward clamp clevis member 121 and (b) the aft clamp clevis member 131. In some embodiments, the aft portion 103 has a "Y" shape such that the aft portion 103 includes a diagonal portion 104 that attaches to the forward clamp clevis member 121. As shown in FIGS. 4 and 5, the diagonal portion 104 does not have a flange on the upper side thereof between the attachment to the forward clamp clevis member 121 and the aft clamp clevis member 131.

As shown in FIGS. 2-5, the interface between the lower frame member 101 and the spreader member 201 may include at least one lug and clevis style arrangement. Other arrangements for the interfaces between the lower frame member 101 and the spreader member 201 may be utilized. For example, the interfaces between the lower frame member 101 and the spreader member 201 may include half lap joints or any other appropriate attachment. In some embodiments, the respective centers of the lower frame member 101 and the spreader member 201 are aligned when these two components are attached to one another. For example, at the interface with the forward lateral member 301, the lower frame member 101 may include a forward clamp clevis member 121 with a forward slot 122 between the left clevis portion 121a and the right clevis portion 121b. The spreader member 201 may include a forward lug member 221 (see FIGS. 6A and 6B) that is disposed within the forward slot 122 when the lower frame member 101 and the spreader member 201 are attached to one another. The internal width of the slot 122 may be approximately equal to the width of the forward lug member 221. In some embodiments, the forward slot 122 is approximately centrally located (in the lateral direction) within the lower frame member 101. In addition, at the interface with the aft lateral member 302, the lower frame member 101 may include an aft clamp clevis member 131 with an aft slot 132 between the left clevis portion 131a and the right clevis portion 131b. The spreader member 201 may include an aft lug member 231 (see FIGS. 6A and 6B) that is disposed within the aft slot 132 when the lower frame member 101 and the spreader member 201 are attached to one another. In some embodiments, the aft slot 132 is approximately centrally located (in the lateral direction) within the lower frame member 101.

In some embodiments, the clamp clevis members 121 and 131 each include at least one hole for clamp fasteners that extend through the lower frame member 101 and the spreader member 201. For example, the forward clamp clevis member 121 may include clamp fastener hole 124 that passes through the left clevis portion 121a and the right clevis portion 121b (see FIG. 5). The aft clamp clevis member 131 may include a first clamp fastener hole 134 and a second clamp fastener hole 135 that each pass through the left clevis portion 131a and the right clevis portion 131b (see FIGS. 4 and 5). When the lower frame member 101 and the spreader member 201 are attached to one another, clamp fastener hole 124 is aligned (and coaxial) with clamp fastener hole 224 of the forward lug member 221 of the spreader member 201. Similarly, when the lower frame member 101 and the spreader member 201 are attached to one another, first clamp fastener hole 134 is aligned (and coaxial) with first clamp fastener hole 234 of the aft lug member 231 and second clamp fastener hole 135 is aligned (and coaxial) with second clamp fastener hole 235 of the aft lug member 231. In some embodiments, at least some of the clamp fastener holes (124, 134, 135, 224, 234, 235) are parallel to the lateral members 301, 302. Fasteners may be inserted into the clamp fastener holes after the spreader member 201 has been arranged relative to the lower frame member 101 such that (1) forward interface hole 281 is coaxial with forward interface hole 181 and (2) aft interface hole 282 is coaxial with aft interface hole 182. When these fasteners are utilized, each fastener passes into and/or through at least three layers including two clevis layers (of the lower frame member 101) and one lug layer (of the spreader member 201).

Although the drawings show a single hole passing through forward clamp clevis member 121 and forward lug member 221 (clamp fastener hole 124 and clamp fastener hole 224), the central frame assembly 100 may be designed with any number of fastener holes to secure the forward clamp clevis member 121 and the forward lug member 221. Similarly, the drawings show two holes passing through aft clamp clevis member 131 and aft lug member 231 including: (1) clamp fastener hole 134 and clamp fastener hole 234; (2) clamp fastener hole 135 and clamp fastener hole 235. However, the central frame assembly 100 may be designed with any number of fastener holes to secure the aft clamp clevis member 131 and the aft lug member 231.

Figure 2:
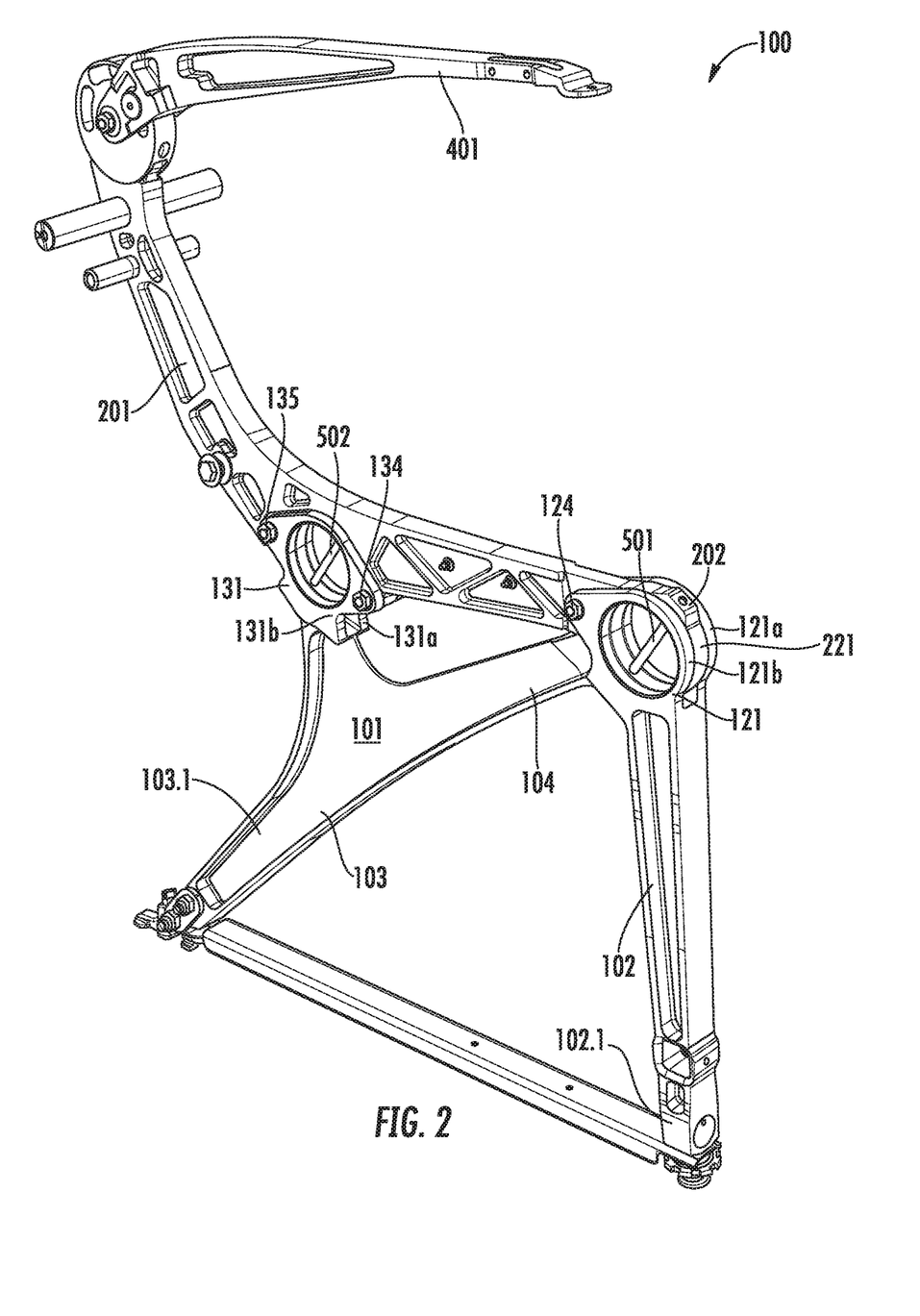
FIG. 2 is a front perspective view of a central frame assembly of the passenger seat of FIG. 1.
Figure 3:
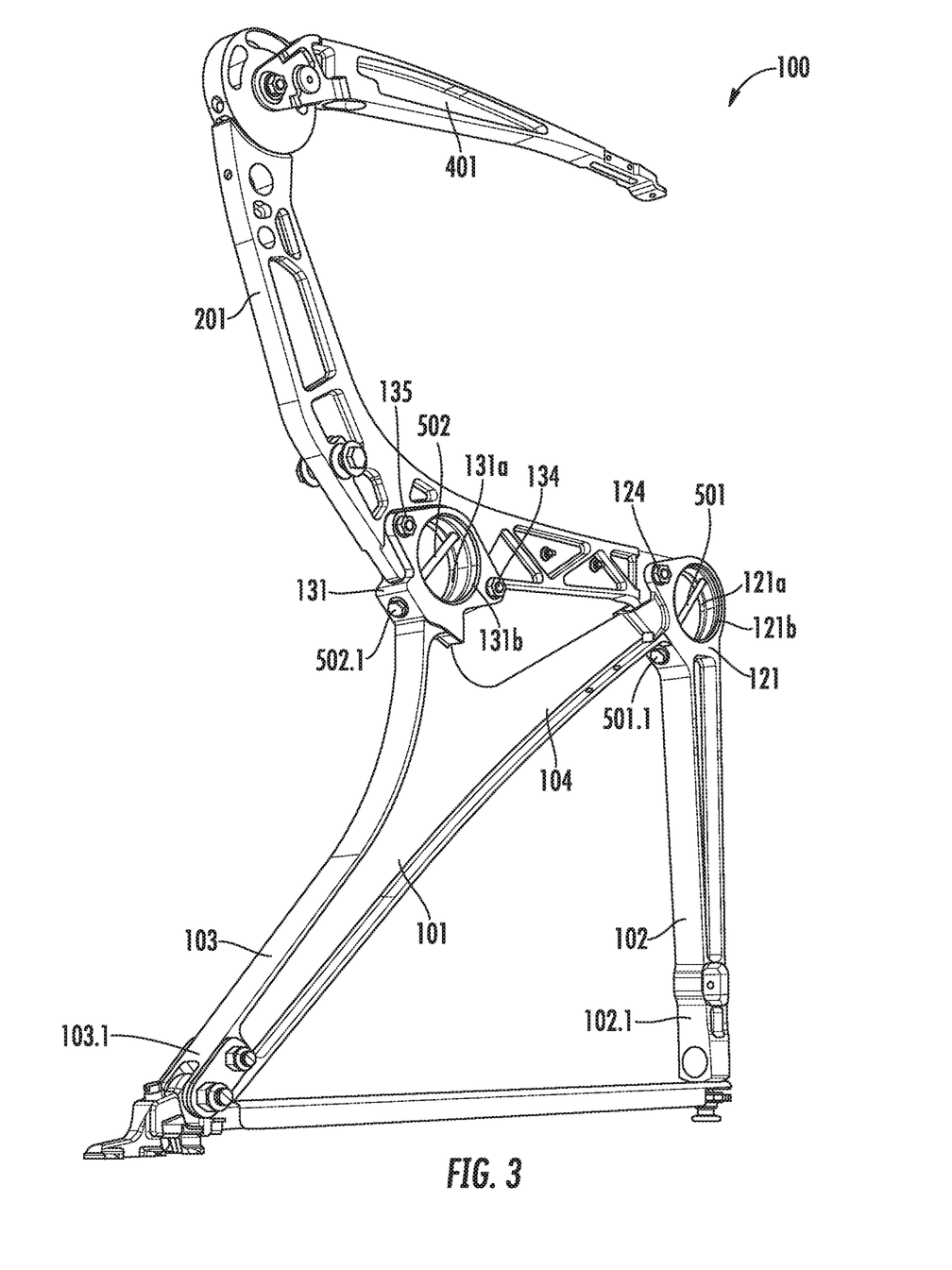
FIG. 3 is a rear perspective view the central frame assembly of FIG. 2.

To secure the lower frame member 101, the spreader member 201, and the lateral members 301, 302, the central frame assembly 100 may include at least one lock fastener that is approximately perpendicular to the lateral members 301, 302. As shown in FIGS. 2 and 3, a first lock fastener 501 may pass through a lower portion of the forward clamp clevis member 121 (of the lower frame member 101), through the forward lateral member 301, and into a protrusion 202 of the forward lug member 221. In other words, the forward lateral member 301 may include a hole through the full diameter thereof that aligns with lock fastener 501 such that lock fastener 501 prevents the central frame assembly 100 from moving along the length of forward lateral member 301. In some embodiments, the protrusion 202 is internally threaded. FIG. 3 shows an example where the head 501.1 of the fastener 501 is visible (forward lateral member 301 is not shown for clarity). A second lock fastener 502 may pass through a lower portion of the aft clamp clevis member 131 (of the lower frame member 101), through the aft lateral member 302, and into a cavity 203 of the aft lug member 231. In other words, the aft lateral member 302 may include a hole through the full diameter thereof that aligns with lock fastener 502 such that lock fastener 502 prevents the central frame assembly 100 from moving along the length of aft lateral member 302. In some embodiments, cavity 203 is internally threaded. FIG. 3 shows an example where the head 502.1 of the fastener 502 is visible (aft lateral member 302 is not shown for clarity).

The components of the seat 10 may be formed of materials including, but not limited to, aluminum, steel, titanium, carbon composite, graphite composite, polyester, nylon, plastic, thermoplastic, other fabric materials, stainless steel, other plastic or polymer materials, other metallic materials, other composite materials, or other similar materials. Moreover, the components of the seat 10 may be attached to one another via suitable fasteners, which include, but are not limited to, screws, bolts, rivets or other mechanical or chemical fasteners.

In the following, further examples are described to facilitate understanding of aspects of the invention:

Example A. A central frame assembly for a passenger seat of a vehicle, the central frame assembly comprising:
a spreader member; and
a lower frame member comprising at least one clamp member for securing the lower frame member relative to the spreader member, wherein:
the lower frame member comprises a vertical portion with a forward lower attachment portion and an aft portion with an aft lower attachment portion; and
the spreader member and the lower frame member are aligned such that a centerline of the spreader member and a centerline of the lower frame member are approximately coplanar.

Example B. The central frame assembly of Example A or any of the preceding or subsequent examples, wherein the at least one clamp member comprises a slot such that a portion of the spreader member is disposed within the slot.

Example C. The central frame assembly of Example B or any of the preceding or subsequent examples, wherein the at least one clamp member comprises at least one interface hole that is coaxial with an interface hole of the spreader member when the spreader member is disposed within the slot.

Example D. The central frame assembly of Example B or any of the preceding or subsequent examples, wherein the at least one clamp member comprises at least one fastener hole that extends through the slot and is coaxial with a fastener hole of the spreader member when the spreader member is disposed within the slot.

Example E. The central frame assembly of Example A or any of the preceding or subsequent examples, wherein the at least one clamp member comprises a left clevis portion and a right clevis portion such that a lug member of the spreader member is disposed between the left and right clevis portions.

Example F. The central frame assembly of Example A or any of the preceding or subsequent examples, wherein:
the lower frame member comprises a forward clamp clevis member defining a forward slot and an aft clamp clevis member defining an aft slot;
the spreader member comprises a forward lug member and an aft lug member;
the forward lug member of the spreader member is disposed within the forward slot; and
the aft lug member of the spreader member is disposed within the aft slot.

Example G. The central frame assembly of Example F or any of the preceding or subsequent examples, wherein:
the forward clamp clevis member comprises at least one fastener hole extending through the forward slot that is coaxial with a fastener hole of the forward lug member of the spreader member; and
the aft clamp clevis member comprises at least one fastener hole extending through the aft slot that is coaxial with a fastener hole of the aft lug member of the spreader member.

Example H. A passenger seat comprising:
a forward lateral member extending in a lateral direction of the passenger seat;
an aft lateral member extending in the lateral direction;
a central frame assembly disposed at a center of the passenger seat in the lateral direction;
wherein the central frame assembly comprises:
a spreader member;
a lower frame member comprising a forward clamp member and an aft clamp member for securing the lower frame member relative to the spreader member;
wherein the lower frame member comprises a vertical portion with a forward lower attachment portion and an aft portion with an aft lower attachment portion; and
wherein the central frame assembly is attached to the forward lateral member and the aft lateral member.

Example I. The passenger seat of Example H or any of the preceding or subsequent examples, wherein the spreader member and the lower frame member are aligned such that a centerline of the spreader member and a centerline of the lower frame member are approximately coplanar.

Example J. The passenger seat of Example H or any of the preceding or subsequent examples, wherein the forward clamp member comprises a forward slot such that a portion of the spreader member is disposed within the forward slot.

Example K. The passenger seat of Example H or any of the preceding or subsequent examples, wherein the aft clamp member comprises a aft slot such that a portion of the spreader member is disposed within the aft slot.

Example L. The passenger seat of Example H or any of the preceding or subsequent examples, wherein at least one of the forward clamp member and the aft clamp member comprises at least one fastener hole that extends in the lateral direction and is coaxial with a fastener hole of the spreader member.

Example M. The passenger seat of Example J or any of the preceding or subsequent examples, wherein the forward clamp member comprises a first interface hole and the spreader member comprises a forward interface hole that is aligned with the first interface hole when the spreader member is disposed within the forward slot.

Example N. The passenger seat of Example M or any of the preceding or subsequent examples, wherein the forward lateral member is disposed inside the first interface hole and the forward interface hole such that the forward lateral member, the first interface hole, and the forward interface hole are all coaxial with one another.

Example O. The passenger seat of Example K or any of the preceding or subsequent examples, wherein the aft clamp member comprises a second interface hole and the spreader member comprises an aft interface hole that is aligned with the second interface hole when the spreader member is disposed within the aft slot.

Example P. The passenger seat of Example O or any of the preceding or subsequent examples, wherein the aft lateral member is disposed inside the second interface hole and the aft interface hole such that the aft lateral member, the second interface hole, and the aft interface hole are all coaxial with one another.

Example Q. The passenger seat of Example H or any of the preceding or subsequent examples, further comprising a first lock fastener extending through at least a portion of the forward clamp member of the lower frame member, through at least a portion of the forward lateral member, and through at least a portion of the spreader member to prevent the central frame assembly from moving relative to the forward lateral member.

Example R. The passenger seat of Example H or any of the preceding or subsequent examples, further comprising a second lock fastener extending through at least a portion of the aft clamp member of the lower frame member, through at least a portion of the aft lateral member, and through at least a portion of the spreader member to prevent the central frame assembly from moving relative to the aft lateral member.

Example S. The passenger seat of Example H or any of the preceding or subsequent examples, wherein:

the forward clamp member comprises a forward slot and the aft clamp member comprises an aft slot;

the spreader member comprises a forward lug member and an aft lug member;

the forward lug member of the spreader member is disposed within the forward slot; and the aft lug member of the spreader member is disposed within the aft slot.

Example T. The passenger seat of Example S or any of the preceding or subsequent examples, wherein:

the forward clamp member comprises at least one fastener hole extending through the forward slot that is coaxial with a fastener hole of the forward lug member of the spreader member; and the aft clamp member comprises at least one fastener hole extending through the aft slot that is coaxial with a fastener hole of the aft lug member of the spreader member.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A central frame assembly for a passenger seat of a vehicle, the central frame assembly comprising:
    a spreader member; and
    a lower frame member comprising at least one clamp member for securing the lower frame member relative to the spreader member, wherein the at least one clamp member comprises a left clevis portion and a right clevis portion such that a lug member of the spreader member is disposed between the left and right clevis portions; and
    wherein:
        the lower frame member comprises a vertical portion with a forward lower attachment portion and an aft portion with an aft lower attachment portion; and
        the spreader member and the lower frame member are aligned such that a centerline of the spreader member and a centerline of the lower frame member are approximately coplanar.

2. The central frame assembly of claim 1, wherein the at least one clamp member comprises a slot such that a portion of the spreader member is disposed within the slot.

3. The central frame assembly of claim 2, wherein the at least one clamp member comprises at least one interface hole that is coaxial with an interface hole of the spreader member when the spreader member is disposed within the slot.

4. The central frame assembly of claim 2, wherein the at least one clamp member comprises at least one fastener hole that extends through the slot and is coaxial with a fastener hole of the spreader member when the spreader member is disposed within the slot.

5. The central frame assembly of claim 1, wherein:
    the lower frame member comprises a forward clamp clevis member defining a forward slot and an aft clamp clevis member defining an aft slot;
    the spreader member comprises a forward lug member and an aft lug member;
    the forward lug member of the spreader member is disposed within the forward slot; and
    the aft lug member of the spreader member is disposed within the aft slot.

6. The central frame assembly of claim 5, wherein:
    the forward clamp clevis member comprises at least one fastener hole extending through the forward slot that is coaxial with a fastener hole of the forward lug member of the spreader member; and
    the aft clamp clevis member comprises at least one fastener hole extending through the aft slot that is coaxial with a fastener hole of the aft lug member of the spreader member.

7. The central frame assembly of claim 1, further comprising the passenger seat comprising:
    a forward lateral member extending in a lateral direction of the passenger seat;
    an aft lateral member extending in the lateral direction;
    wherein the central frame assembly is disposed at a center of the passenger seat in the lateral direction;
    wherein the spreader member further comprises a forward lug member and an aft lug member;
    wherein the at least one clamp member further comprises a forward clamp member and an aft clamp member;
    wherein the forward clamp member comprises a forward slot and the aft clamp member comprises an aft slot;
    the forward lug member of the spreader member is disposed within the forward slot; and
    the aft lug member of the spreader member is disposed within the aft slot; and
    wherein the central frame assembly is attached to the forward lateral member and the aft lateral member.

8. The central frame assembly of claim 7, wherein the aft clamp member comprises an aft slot such that a portion of the spreader member is disposed within the aft slot.

9. The central frame assembly of claim 7, wherein at least one of the forward clamp member and the aft clamp member comprises at least one fastener hole that extends in the lateral direction and is coaxial with a fastener hole of the spreader member.

10. The central frame assembly of claim 7, wherein the forward clamp member comprises a first interface hole and the spreader member comprises a forward interface hole that is aligned with the first interface hole when the spreader member is disposed within the forward slot.

11. The central frame assembly of claim 10, wherein the forward lateral member is disposed inside the first interface hole and the forward interface hole such that the forward lateral member, the first interface hole, and the forward interface hole are all coaxial with one another.

12. The central frame assembly of claim 8, wherein the aft clamp member comprises a second interface hole and the spreader member comprises an aft interface hole that is aligned with the second interface hole when the spreader member is disposed within the aft slot.

13. The central frame assembly of claim 12, wherein the aft lateral member is disposed inside the second interface hole and the aft interface hole such that the aft lateral member, the second interface hole, and the aft interface hole are all coaxial with one another.

14. The central frame assembly of claim 7, further comprising a first lock fastener extending through at least a portion of the forward clamp member of the lower, frame member, through at least a portion of the forward lateral member, and through at least a portion of the spreader member to prevent the central frame assembly from moving relative to the forward lateral member.

15. The central frame assembly of claim 7, further comprising a second lock fastener extending through at least a portion of the aft clamp member of the lower frame member, through at least a portion of the aft lateral member, and through at least a portion of the spreader member to prevent the central frame assembly from moving relative to the aft lateral member.

16. The central frame assembly of claim 7, wherein:
the forward clamp member comprises at least one fastener hole extending through the forward slot that is coaxial with a fastener hole of the forward lug member of the spreader member; and
the aft clamp member comprises at least one fastener hole extending through the aft slot that is coaxial with a fastener hole of the aft lug member of the spreader member.

* * * * *